(12) United States Patent
Sakata et al.

(10) Patent No.: US 8,493,321 B2
(45) Date of Patent: Jul. 23, 2013

(54) IMAGE DISPLAY DEVICE HAVING A THIN DISPLAY PANEL

(75) Inventors: Tatsuya Sakata, Tokyo (JP); Takeya Meguro, Tokyo (JP)

(73) Assignee: Sony Corporation (JP)

( * ) Notice: Subject to any disclaimer, the term of this patent is extended or adjusted under 35 U.S.C. 154(b) by 747 days.

(21) Appl. No.: 12/001,968

(22) Filed: Dec. 13, 2007

(65) Prior Publication Data

US 2008/0158111 A1 Jul. 3, 2008

(30) Foreign Application Priority Data

Dec. 27, 2006 (JP) ................................ P2006-352610

(51) Int. Cl.
*G09G 5/00* (2006.01)
(52) U.S. Cl.
USPC ......................................................... 345/156
(58) Field of Classification Search
USPC ...... 345/156, 905; 381/303–305; 361/679.23, 361/679.55, 679.46
See application file for complete search history.

(56) References Cited

U.S. PATENT DOCUMENTS

| | | | |
|---|---|---|---|
| 6,381,125 B1 | 4/2002 | Mizoguchi et al. | |
| 6,654,234 B2 * | 11/2003 | Landry et al. | 361/679.27 |
| 7,271,997 B2 * | 9/2007 | Kee et al. | 361/679.27 |
| 2002/0057813 A1 * | 5/2002 | Burleson et al. | 381/189 |
| 2002/0080107 A1 * | 6/2002 | Fujimoto et al. | 345/87 |
| 2003/0003945 A1 * | 1/2003 | Saiki et al. | 455/550 |
| 2004/0004591 A1 * | 1/2004 | Akimoto et al. | 345/84 |
| 2004/0164992 A1 * | 8/2004 | Gangnet et al. | 345/591 |
| 2004/0240689 A1 * | 12/2004 | Miyamoto | 381/306 |
| 2005/0116913 A1 * | 6/2005 | Ha et al. | 345/89 |
| 2006/0114236 A1 * | 6/2006 | Ray | 345/172 |
| 2006/0202630 A1 | 9/2006 | Yamada | |
| 2006/0244721 A1 * | 11/2006 | Wang et al. | 345/156 |
| 2007/0001971 A1 * | 1/2007 | Kumagai et al. | 345/98 |

FOREIGN PATENT DOCUMENTS

| | | |
|---|---|---|
| JP | 7-064487 A | 3/1995 |
| JP | 9-168127 A | 6/1997 |
| JP | 2000-189675 A | 7/2000 |
| JP | 2003-280533 A | 10/2003 |
| JP | 2006-058679 A | 3/2006 |
| WO | 2004010207 A1 | 1/2004 |

OTHER PUBLICATIONS

European Search Report EP 07150420, dated Jun. 20, 2011.

* cited by examiner

*Primary Examiner* — Chanh Nguyen
*Assistant Examiner* — Jonathan Blancha
(74) *Attorney, Agent, or Firm* — Lerner, David, Littenberg, Krumholz & Mentlik, LLP

(57) ABSTRACT

An image display device having an image display panel includes: as a casing, a base part mountable on a horizontal surface, a rising part rising from the base part at a predetermined angle, and a panel retaining part connected to an upper part of the rising part, the panel retaining part retaining the image display panel; a first circuit board for processing an image signal to be displayed on the image display panel, the first circuit board being disposed in the base part; and a second circuit board for generating a driving signal for driving the image display panel for display on a basis of the image signal processed by the first circuit board, the second circuit board being disposed in the rising part; wherein the driving signal generated by the second circuit board is supplied to the image display panel, and the image display panel displays an image.

5 Claims, 8 Drawing Sheets

F I G . 4
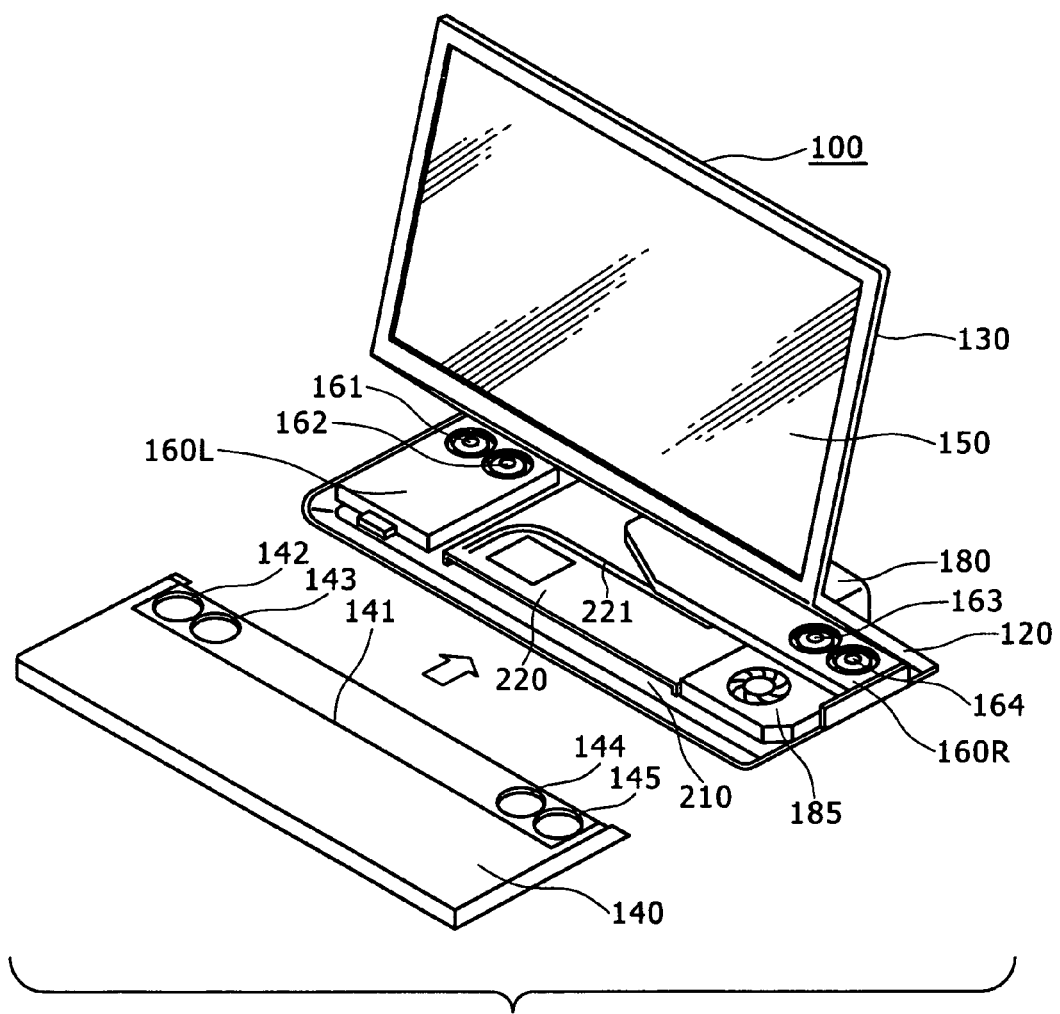

IMAGE DISPLAY DEVICE HAVING A THIN DISPLAY PANEL

CROSS-REFERENCE TO RELATED APPLICATIONS

The present application claims priority from Japanese Patent Application No. JP 2006-352610, filed in the Japan Japanese Patent Office on Dec. 27, 2006, the entire content of which is incorporated herein by reference.

BACKGROUND OF THE INVENTION

1. Field of the Invention

The present invention relates to an image display device suitable for application to a television receiver, a display for a computer, and the like.

2. Description of the Related Art

There have been various forms of casings forming a television receiver in the past. Various television receivers using a thin display panel such as a liquid crystal display panel or the like, in particular, have recently spread, which receivers have a smaller thickness than television receivers using existing cathode-ray tubes.

FIG. 8 is a diagram showing an example of configuration of a television receiver using an existing liquid crystal display panel.

A television receiver 10 is formed by a relatively thin casing 11 that supports itself on a stand 12. A liquid crystal display panel 13 is disposed in a front surface of the casing 11. A backlight 14 is disposed on the back of the liquid crystal display panel 13. Further, a circuit board 15 is disposed on the back side of the backlight 14. The circuit board 15 incorporates for example a tuner for receiving a broadcast signal, a circuit for processing the image signal (video signal) received by the tuner and input to the circuit, and a driving circuit for driving the liquid crystal display panel 13 for display on the basis of the image signal.

As shown in FIG. 8, disposing the backlight 14 and the circuit board 15 on the back of the liquid crystal display panel 13 enables the size of the casing 11 as viewed from the front to be slightly larger than the display panel 13, thus contributing to the reduced size of the casing 11.

Japanese Patent Laid-Open No. 2006-58679 discloses an example of a display device having this kind of configuration.

SUMMARY OF THE INVENTION

However, in the case of the configuration shown in FIG. 8, while the contribution is made to the reduced size of the casing 11 as viewed from the front, there is a limitation to reduction in thickness of the casing because the backlight and the circuit board are incorporated in the casing. Therefore it may not be said that the casing has a shape that makes the most of the small thickness of the display panel. Recently, various thin display panels that obviate a need for the backlight other than the liquid crystal display panel have been developed. Even with such a constitution, disposing a circuit board on the back would correspondingly increase the thickness of the casing, and thus result in a device shape that does not make the most of the reduced thickness of the panel.

In addition, when the circuit board is disposed on the back of the display panel, a shield needs to be provided between the circuit board and the display panel in order to prevent undesired radiation from the circuit board to the front side of the device. Disposing such a shield member complicates the configuration of the device. A circuit board incorporating a circuit for a television receiver, in particular, demands a relatively large area, and therefore the shield member is also increased in size. In the case of the liquid crystal display panel demanding the backlight, a cover on the back of the backlight may function as the shield member. However, in the case of a display panel that does not demand a backlight, a dedicated shield member needs to be disposed. To avoid the problem of the shield member demands that the display panel and the circuit board be disposed at a distance from each other. However, simply disposing the circuit board at a position distant from the display panel increases the size of the casing forming the television receiver.

The present invention has been made in view of the above. It is desirable to provide, as an image display device incorporating a thin display panel, a novel image display device having a simple and excellent constitution that makes the most of the small thickness of the display panel.

The present invention is formed as an image display device having an image display panel. The image display device includes, as a casing of the image display device, a base part mountable on a horizontal surface, a rising part rising from the base part at a predetermined angle, and a panel retaining part connected to an upper part of the rising part, the panel retaining part retaining the image display panel. A first circuit board for processing an image signal to be displayed on the image display panel is disposed in the base part of the casing. A second circuit board for generating a driving signal for driving the image display panel for display on a basis of the image signal processed by the first circuit board is disposed in the rising part of the casing. The driving signal generated by the second circuit board is supplied to the image display panel, and the image display panel displays an image.

Thus, the first circuit board and the second circuit board are disposed separately from each other in the base part and the rising part of the casing forming the image display device. The second circuit board side within the rising part at a position close to the retaining part for retaining the image display panel generates the driving signal for making display on the image display panel, and then supplies the driving signal to the image display panel. Thereby the driving signal can be supplied to the image display panel through a shortest path. Because the first circuit board and the second circuit board are disposed in the base part and the rising part situated at continuous positions, the signal processed by the first circuit board can also be supplied to the second circuit board through a shortest path. In addition, because the image display panel and each circuit board are disposed at different positions, it suffices to dispose a minimum shield member.

According to an embodiment of the present invention, each part is disposed in a state of another circuit board or the like not being superposed in the panel retaining part for retaining the image display panel. A device configuration of a favorable shape is made possible which configuration makes the most of the small thickness of the image display panel itself and which demands a minimum shield member. In addition, processes from the processing of a signal input to the image display device for display to the supply of the signal to the image display panel are sequentially performed in the first circuit board within the base part and then in the second circuit board within the rising part. The signal is thus delivered to the image display panel through a shortest path conforming to the shape of the casing forming the image display device. It is therefore possible to minimize the effect of undesired radiation caused by routed wiring or the like, perform excellent signal processing, and make image display with excellent image quality.

BRIEF DESCRIPTION OF THE DRAWINGS

FIG. 4 is a perspective view showing an example of a device according to one embodiment of the present invention in a partially disassembled state from the front side;

DETAILED DESCRIPTION OF THE PREFERRED EMBODIMENT

An embodiment of the present invention will hereinafter be described with reference to FIGS. 1 to 7.

Figure 1:
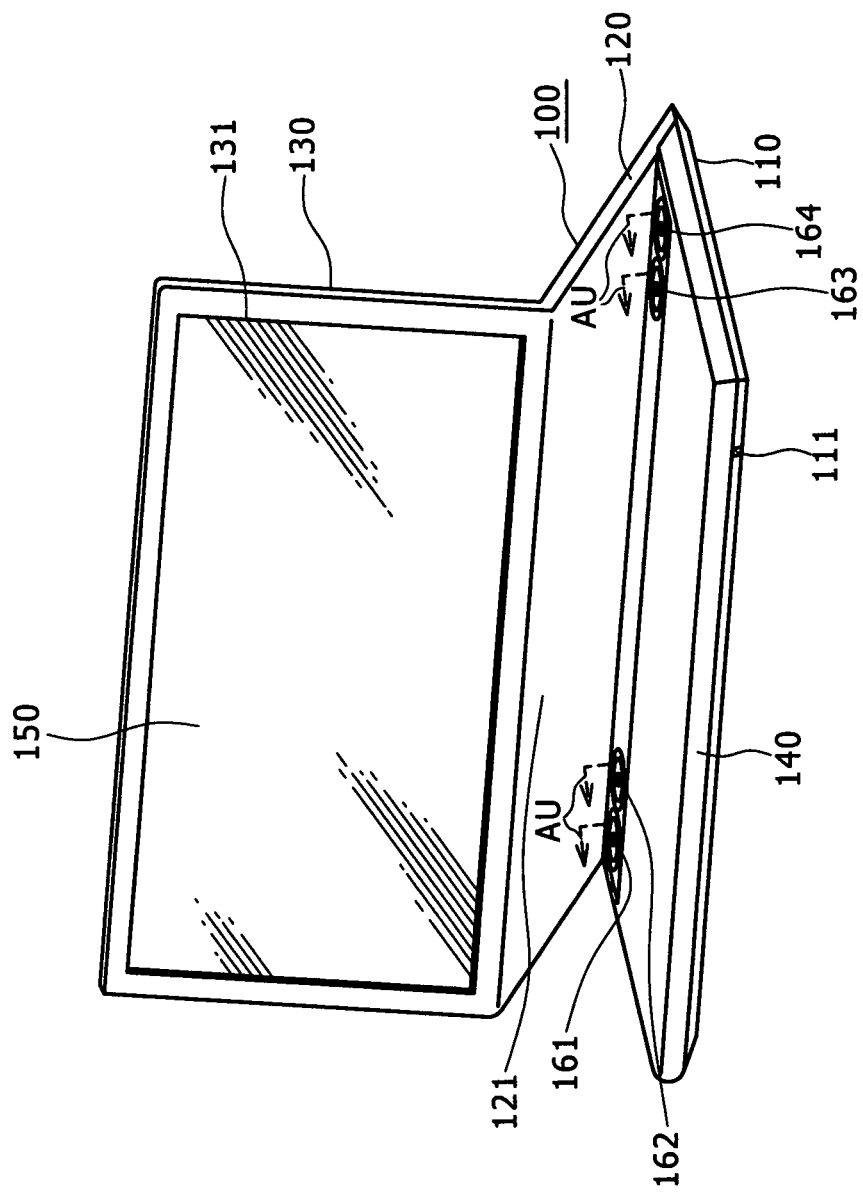
FIG. 1 is a perspective view showing an example of a device according to one embodiment of the present invention from a front side.
Figure 2:
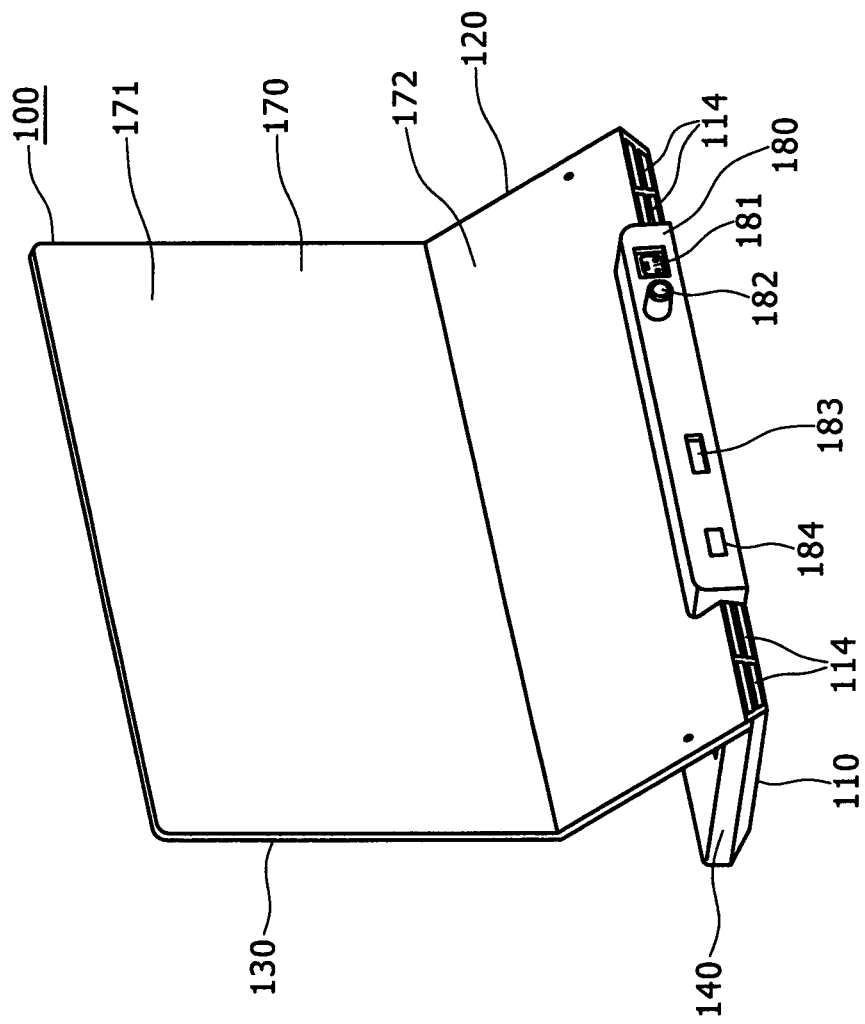
FIG. 2 is a perspective view showing an example of a device according to one embodiment of the present invention from a back side.
Figure 3:
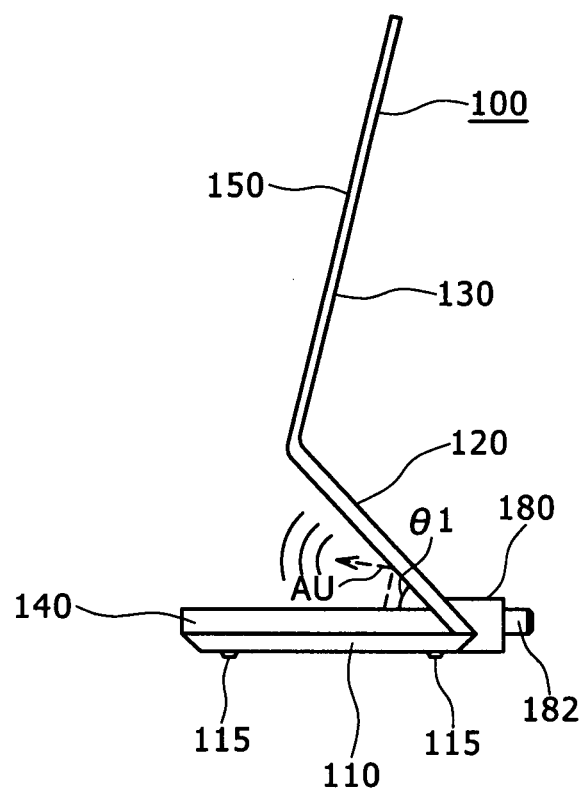
FIG. 3 is a side view showing an example of a device according to one embodiment of the present invention.

FIG. 1 is a perspective view of a television receiver 100 according to the present embodiment as viewed from a front side. FIG. 2 is a perspective view of the television receiver 100 as viewed from a back side. FIG. 3 is a side view of the television receiver 100.

As shown in FIG. 1, the television receiver 100 includes as a casing for forming the main body of the receiver: a base part 110; a rising part 120 rising from the rear of the base part 110 at a predetermined angle; and a panel retaining part 130 connected to the upper edge of the rising part 120. The panel retaining part 130 has a frame part 131. The image display area of a display panel 150 is disposed in the frame part 131. In the present embodiment, an organic EL (electro-luminescence) panel is used for the image display panel 150. The organic EL panel is a panel in which light emitting bodies formed by an organic material are arranged in the form of, for example, a matrix for image display. Because the light emitting bodies formed on the panel emit light, the organic EL panel does not demand a backlight. In the present embodiment, the length of a diagonal line of the screen is about 13 inches as screen size.

The base part 110 and the rising part 120 have a width equal to the breadth of the panel retaining part 130. An angle θ1 (FIG. 3) formed by the base part 110 and the rising part 120 is about 45 degrees. As shown in FIG. 3, the panel retaining part 130 connected to the upper part of the rising part 120 is slightly inclined to the rear rather than being upright. The base part 110, the rising part 120, and the panel retaining part 130 are each formed by a metallic plate such as a stainless plate and an aluminum plate.

The base part 110 is formed on a flat plate so as to be able to be placed on a horizontal surface such as the top of a table or the like. As shown in FIG. 1, a base part cover 140 is disposed as the upper surface of the base part 110. As shown in FIG. 3, a leg part 115 formed by rubber or the like is attached to a plurality of positions (for example four positions) of a lower part of the base part 110. The base part cover 140 is also formed by a metal. Four speaker units 161, 162, 163, and 164 are disposed in the rear of the upper surface of the base part 110. The speaker units 161, 162, 163, and 164 are housed in twos in speaker boxes 160L and 160R (FIG. 4), as will be described later. Relatively thin speaker units that all have a same size are used as the speaker units 161, 162, 163, and 164. The sound (audio) output surfaces are arranged horizontally in a lateral row in the rear of the base part cover 140 as the upper surface of the base part 110.

With the speaker units 161, 162, 163, and 164 thus arranged, as indicated by dashed arrows in FIG. 1 and FIG. 3, audio in an output state AU from the speaker units 161 to 164 goes up vertically in straight lines from the speaker units 161 to 164, hits the inner wall 121 of the inclined rising part 120, and then bends frontward. Thus, the sound goes to the side of a user viewing display of the display panel 150.

An infrared light receiving window 111 is disposed at a front edge of the base part 110. A light receiving element 113 (FIG. 6) for receiving the light of a remote control signal (infrared signal) from a remote control device is disposed on the inside of the infrared light receiving window 111.

As shown in FIG. 2, which shows the back side of the television receiver 100 according to the present embodiment, the television receiver 100 has a back cover 170 attached to the back of the rising part 120 and the panel retaining part 130. A cover part 171 of the panel retaining part 130 and a cover part 172 of the rising part 120 are formed integrally with each other as the back cover 170. The back cover 170 is also made of a metal.

As shown in FIG. 2, a terminal cover 180 is attached to the center of the rear end of the base part 110. Each terminal necessary for the television receiver 100 is attached to a position where the terminal cover 180 is disposed. That is, a power supply input terminal 181, an F terminal 182, an HDMI terminal 183, and a LAN terminal 184 are disposed. However, these terminals 181 to 184 are attached to a board side to be described later, and the terminal cover 180 only covers the periphery of electronic parts forming each terminal. Ventilation holes 114 are provided on the left side and the right side of the rear end of the base part 110, so that a heat dissipating process can be performed by the action of a fan to be described later.

A state in which each member is disposed within the casing for forming the television receiver 100 will next be described with reference to FIG. 4 and subsequent figures.

FIG. 4 is a diagram showing the inside of the base part 110 with the base part cover 140 removed from the base part 110. As shown in FIG. 4, a circuit board 210 is disposed at the center of the base part 110, and a shield plate 220 is disposed on the circuit board 210. The circuit board 210 is disposed substantially horizontally within the base part 110. A heat pipe 221 for cooling is attached to the shield plate 220 in the present example. Speaker boxes 160L and 160R are arranged on the left and the right of the base part 110. The speaker box 160L of the speaker boxes 160L and 160R has two speaker units 161 and 162 mounted therein to reproduce audio of a left channel. The speaker box 160R has two speaker units 163 and 164 mounted therein to reproduce audio of a right channel. The four speaker units 161 to 164 used in this case all have a same size and same characteristics.

As shown in FIG. 4, a fan 185 is disposed in front of the right-channel speaker box 160R. The two speaker boxes 160L and 160R have different shapes in order to avoid a position in which the fan 185 is disposed. However, although the two speaker boxes 160L and 160R have different shapes, the volumes of the two speaker boxes 160L and 160R are substantially the same, so that acoustic characteristics of the left channel are equal to acoustic characteristics of the right channel. Through holes 142, 143, 144, and 145 are provided in the base part cover 140 in such a manner as to correspond to the positions where the respective speaker units 161 to 164 are disposed. The through holes 142 to 145 for the speakers are provided in a depression part 141 in the rear of the base part cover 140.

The fan 185 cools circuit parts on the circuit board 210 which circuit parts generate heat by operating. The fan 185 performs a cooling process using the ventilation holes 114 shown in FIG. 2. At this time, one end of the heat pipe 221 is disposed in the vicinity of a part where ventilation for cooling is provided, so that a cooling effect of the circuit board 210 is enhanced. The ventilation holes 114 shown in FIG. 2 are provided to the right and to the left of the rear end of the base part 110. One of the ventilation holes 114 is used as an intake for a cooling air, and the other ventilation hole 114 is used as an outlet for the cooling air. Thus, a flow of air is produced by the fan 185 so as to pass the positions where the circuit board 210 and the shield plate 220 are disposed.

Figure 5:
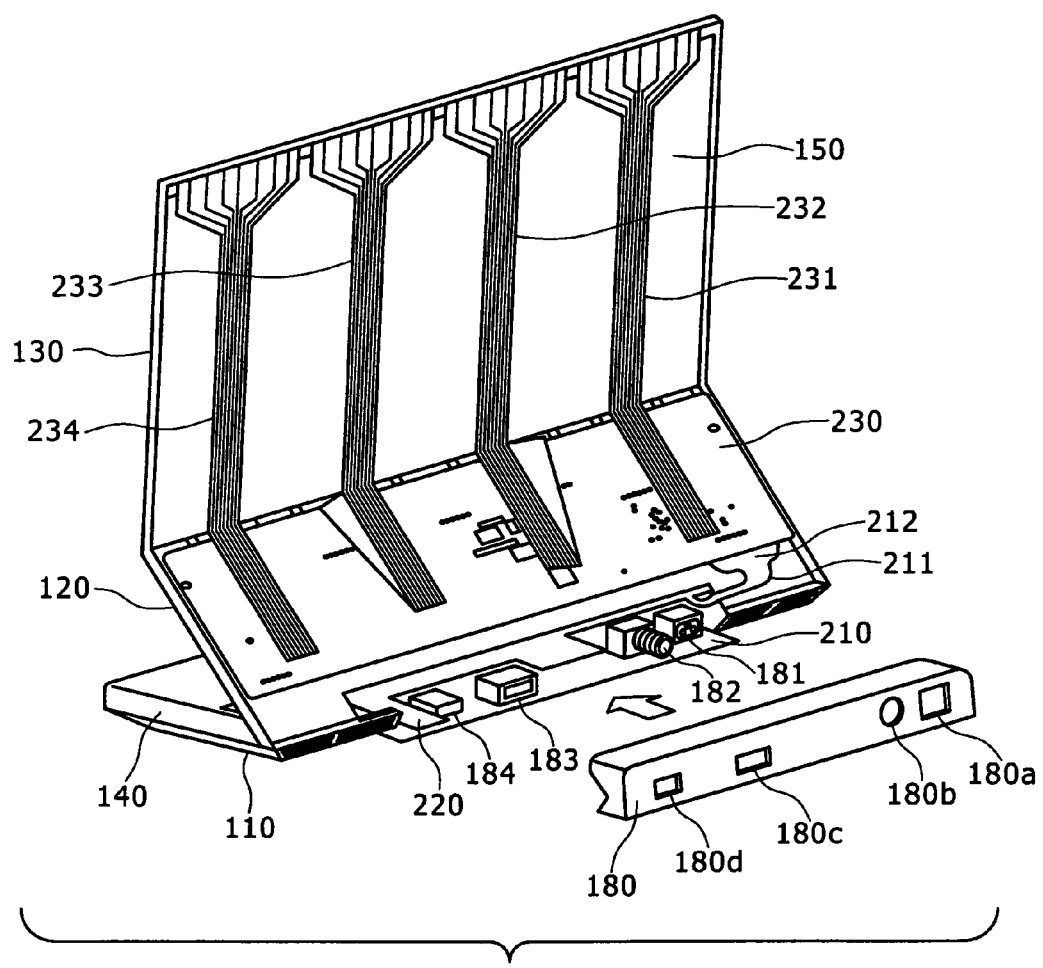
FIG. 5 is a perspective view showing an example of a device according to one embodiment of the present invention in a partially disassembled state from the back side.

FIG. 5 shows a state in which the back cover 170 and the terminal cover 180 are removed from the rear of the television receiver 100 shown in FIG. 2. The circuit board 210 is disposed in a central part of the rear of the base part 110 in a state of being slightly projected. The parts forming the respective terminals (the power supply input terminal 181, the F terminal 182, the HDMI terminal 183, and the LAN terminal 184) are mounted on the rear end part of the circuit board 210. Then, as shown in FIG. 5, through holes 180a, 180b, 180c, and 180d corresponding to the disposing positions of the respective terminals are arranged in the terminal cover 180. The terminal cover 180 is connected to the casing, whereby each terminal is in a disposed state as shown in FIG. 2.

An example of a circuit formed on the circuit board 210 on which these terminals are arranged will be described later with reference to FIG. 7. However, the circuit on the circuit board 210 basically performs reception processing for an input broadcast signal, subjects an image signal obtained by the reception processing or an externally input image signal (video signal) to processing for display, and also performs audio signal processing. The image signal for display after being processed by the circuit board 210 is supplied to a driving circuit board 230 disposed in the rising part 120. In order to supply the image signal to the driving circuit board 230, a connector 212 at an end of a signal line 211 extracted from the circuit board 210 is connected to a terminal part (not shown) on a lower end side of the driving circuit board 230.

As shown in FIG. 5, the driving circuit board 230 is of such a size as to cover substantially an entire surface within the rising part 120. A circuit formed on the driving circuit board 230 generates a driving signal for driving each pixel within the display panel 150. The driving circuit board 230 is formed as a circuit board having a breadth substantially equal to the breadth of the display panel 150. The driving signal generated within the driving circuit board 230 is sent to the display panel 150 using a plurality of flexible boards 231, 232, 233, and 234. In the present example, the driving signal is sent to a lateral row at an upper end of the display panel 150, and upper ends of the four flexible boards 231 to 234 are connected to most of the upper end of the display panel 150.

Figure 6:
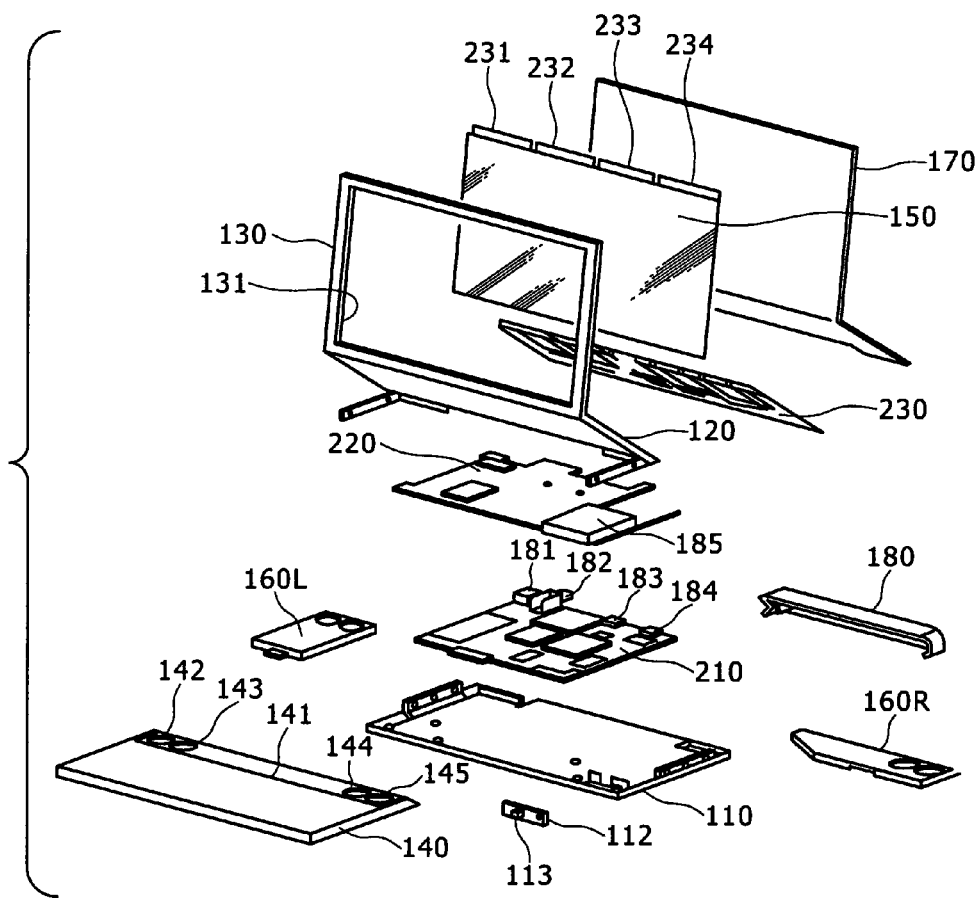
FIG. 6 is an exploded perspective view showing an example of a device according to one embodiment of the present invention in a disassembled state.

FIG. 6 is a diagram showing the parts described thus far in a disassembled state. The upper end of the surface of the display panel 150, which is configured as an organic EL panel by forming light emitting elements on a glass substrate, is connected from a back side to the end parts of the four flexible boards 231 to 234. The driving signal is supplied from the driving circuit board 230 side to the display panel 150.

Incidentally, a light emitting element 113 attached to a small board 112 is mounted on the back side of the infrared light receiving window 111 (FIG. 1) within the base part 110. A light guiding member formed by a transparent resin member or the like is disposed between the light emitting element 113 and the infrared light receiving window 111, so that light incident from the infrared light receiving window 111 enters the light emitting element 113 effectively.

This light emitting element 113 is electrically connected to the circuit board 210. A controlling unit 212 to be described later determines the code of a received remote control signal, and then performs predetermined control.

Figure 7:
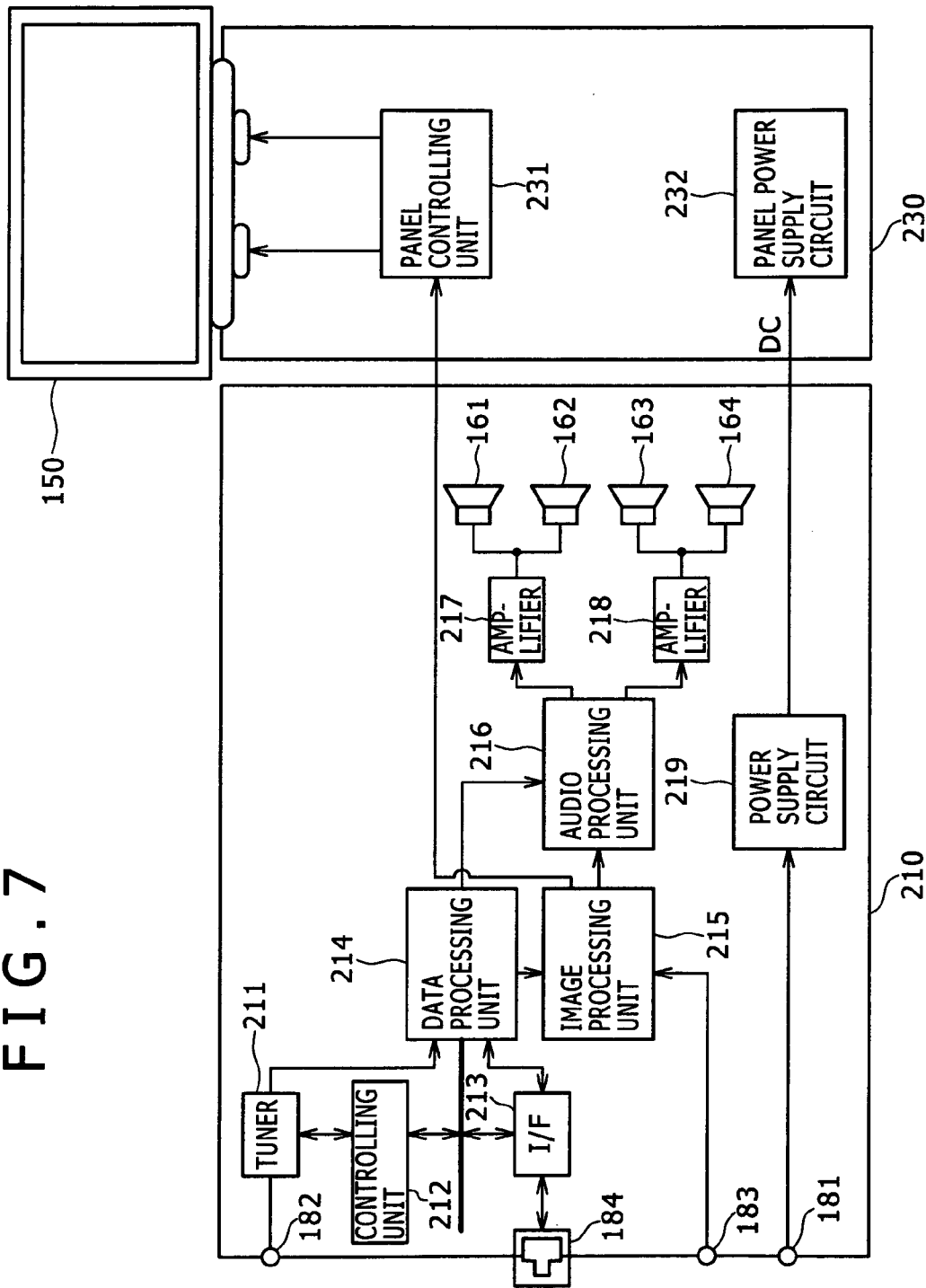
FIG. 7 is a block diagram showing an example of a device according to one embodiment of the present invention.
Figure 8:
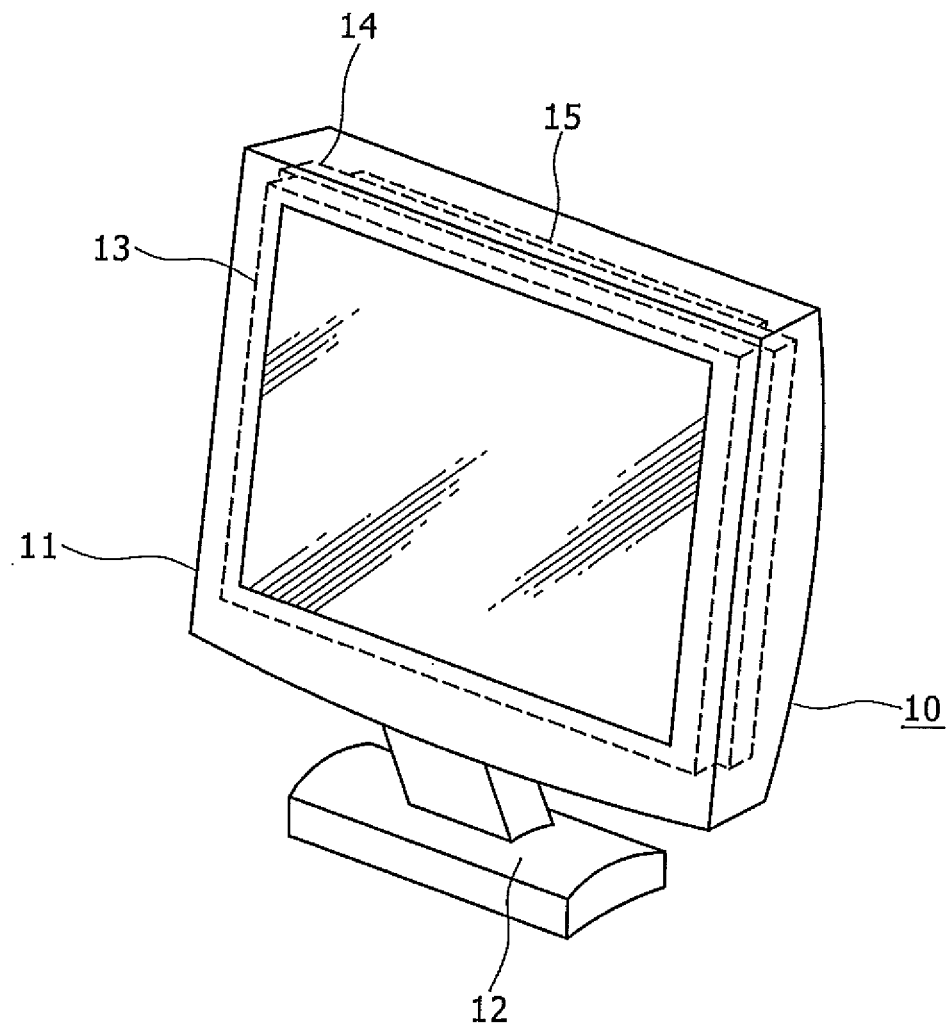
FIG. 8 is a perspective view showing an example of configuration of an existing television receiver.

FIG. 7 is a diagram showing an example of configuration of a circuit formed on the circuit board 210 and the driving circuit board 230 in the present example. The circuit configuration will be described below. The F terminal 182 connected with an antenna wire or the like is connected to a tuner 211. The tuner 211 receives a broadcast signal obtained by the F terminal 182. A received channel is set by control of the controlling unit 212. The image signal received and obtained by the tuner 211 is sent to a data processing unit 214 to be subjected to various data processing, and then sent to an image processing unit 215. A signal received by the network terminal 184 is sent to an interface unit 213. A received control signal is sent to the controlling unit 212, whereas a received image signal is sent to the data processing unit 214 and thereafter sent to the image processing unit 215.

The image processing unit 215 performs various image processing necessary for making display. An image signal resulting from image processing in the image processing unit 215 is sent to the driving circuit board 230. A panel controlling unit 231 within the driving circuit board 230 generates a signal for driving each pixel of the display panel 150. The driving signal is sent to the display panel 150.

An image signal obtained by the HDMI terminal 183 is directly sent to the image processing unit 215. The image processing unit 215 sends an audio signal superimposed on the image signal to an audio processing unit 216. An audio signal obtained by the data processing unit 214 via the tuner 211 or the like is also sent to the audio processing unit 216. The audio processing unit 216 for example converts such an audio signal into an analog audio signal. An audio signal of the left channel and an audio signal of the right channel are amplified by amplifiers 217 and 218 separately from each other, and then output from the speaker units 161 to 164.

A direct-current power is input to the power supply input terminal 181. A power supply circuit 219 within the circuit board 210 generates a direct-current power having a voltage necessary for each circuit within the circuit board 210, and then supplies the direct-current power to each circuit. Further, the power supply circuit 219 supplies a power to a panel power supply circuit 232 in the driving circuit board 230. The panel power supply circuit 232 supplies the power necessary for the panel controlling unit 231.

The above-described television receiver 100 according to the present embodiment is formed as an excellent device that makes the most of the small thickness of the display panel 150. Specifically, the circuit board 210 and the driving circuit board 230 are formed within the base part 110 and the rising part 120, respectively. In the panel retaining part 130 retaining the display panel 150, the display panel 150 is disposed without another circuit board or the like being placed on the display panel 150. Thus, as shown in FIG. 3 as a side view, the panel retaining part 130 having the display panel 150 disposed therein can be made very thin (for example a thickness of a few mm). In addition, because the display panel 150 and each of the circuit boards 210 and 230 are disposed in such positions as not to be laid one upon the other, no shield member needs to be disposed on the back of the display panel 150, and thus a device configuration of a favorable shape is made possible. In the present example, only the shield plate 220 on the circuit board 210 within the base part 110 is used as a shield member.

In addition, processes from the processing of a signal input to the television receiver 100 for display to the supply of the signal to the image display panel are sequentially performed as a reception process (or an input process) in the circuit board 210 within the base part 110 and then a panel driving process in the driving circuit board 230 within the rising part 120. The signal is thus delivered to the display panel 150 through a shortest path conforming to the shape of the casing forming the television receiver 100. It is therefore possible to minimize the effect of undesired radiation caused by routed wiring or the like, perform excellent signal processing, and make image display with excellent image quality. In addition, in the present embodiment, while a signal needs to be input to substantially the entire breadth of the display panel 150, by making the driving circuit board 230 have a breadth substantially equal to the display panel 150, the signal can be supplied to the display panel 150 favorably through a relatively short signal path.

In addition, the circuit board that performs the signal receiving process or the input process is disposed substantially horizontally in the base part 110, and parts forming input terminals are disposed on the rear end part of the board. Because the terminals are formed by the parts, another board for the input terminals is not requisite, and thus a device configuration can be made very simple.

It is to be noted that while in the embodiment explained thus far, description has been made of an example in which an organic EL panel is used as an image display panel, the television receiver may use other thin panels for image display. For example, the present invention may be applied to displays based on a display principle referred to as electronic paper. Alternatively, a liquid crystal display panel may be used. When a liquid crystal display panel is used, a backlight needs to be incorporated, and it is thus difficult to achieve a reduced thickness as in the example of FIG. 3. However, by forming a similar casing and similarly arranging each circuit board, it is possible to perform efficient operations from the reception and input of signals to the supply of a driving signal to the panel.

In addition, the shape of the casing described in the foregoing embodiment is one example, and is not limited to the formations shown in respective figures. For example, while the rising part 120 has a shape such that the rising part 120 is disposed at a relatively great angle of inclination of about 45 degrees, the rising part 120 may have an upright form at a less angle.

In addition, the circuit configuration shown in FIG. 7 is one example, and is not limited to the configuration of FIG. 7. For example, a part of the circuit incorporated in the circuit board 210 included in the base part 110 may be incorporated into the driving circuit board 230 side included in the rising part 120.

In addition, while the present embodiment is an example of an image display device formed as a television receiver including a tuner, the present invention may be applied to image display devices as a so-called monitor having only a terminal for receiving an image signal (video signal). For example, the image display device may be configured as a display for a computer device.

It should be understood by those skilled in the art that various modifications, combinations, sub-combinations and alterations may occur depending on design requirements and other factors insofar as they are within the scope of the appended claims or the equivalents thereof.

What is claimed is:

1. A television receiver, comprising:
an image display panel;
a casing having a base part mountable on a horizontal surface, a rising part rising from said base part at a predetermined angle, and a panel retaining part connected to an upper part of said rising part, said panel retaining part retaining said image display panel;
a first circuit board having a shield member, a tuner to receive a broadcast television signal, an image processing unit for processing an image signal to be displayed on said image display panel, and an audio processing unit for processing an audio signal, said first circuit board being disposed in said base part;
a second circuit board for generating a driving signal for driving said image display panel for display on a basis of the image signal processed by said first circuit board, said second circuit board having a width which is substantially the same as that of said image display panel, said second circuit board being disposed in said rising part;
wherein the driving signal generated by said second circuit board is supplied to said image display panel, and said image display panel displays an image,
the image display panel is disposed in said panel retaining part without a circuit board placed thereon such that said panel retaining part has a thickness of a few millimeters, and
the shield member is the only shield member in the television receiver and is arranged on the first circuit board in said base part such that a back of said image display panel does not have a shield member;
a cooling unit disposed in the base part; and
first and second speaker boxes disposed at opposing ends of an upper surface of the base part, the first speaker box including a first plurality of speaker units, the second speaker box including a second plurality of speaker units, each speaker unit of the first and second pluralities of speaker units being disposed at a rear portion of the base part and adjacent to a front surface of the rising part with a sound output surface thereof facing upward toward the front surface of the rising part so that sound from the respective sound output surface hits the front surface of the rising part and is thereby directed frontward, the audio signal processed by the audio processing unit being supplied to each speaker unit, the first and second speaker boxes having different shapes to avoid a position at which the cooling unit is disposed but having substantially same volumes so that the first and second speaker boxes have equal acoustic characteristics with the speaker units of the first and second pluralities of speaker units having a same size and being arranged in a lateral row in parallel with a rear edge of the rear portion of the base part.

2. The television receiver according to claim 1, wherein said image display panel is an organic electro-luminescence panel formed by arranging light emitting bodies formed by an organic material on a substrate, and the driving signal generated by said second circuit board is a signal for driving the organic electro-luminescence panel.

3. The television receiver according to claim 1, wherein a terminal part formed as an input terminal is attached to a rear end part of said first circuit board, and the input terminal is disposed at a rear end of said base part.

4. The television receiver according to claim 1, wherein the predetermined angle is 45 degrees or less, and the first and second speaker boxes each include two speaker units each disposed at the rear portion of the base part and adjacent to the front surface of the rising part.

5. The television receiver according to claim 1, further comprising a plurality of flexible boards disposed behind the display panel, each flexible board having a lower end connected to the second circuit board and an upper end connected to an upper end of the display panel such that the driving signal is delivered to a lateral row located at the upper end of the display panel.

* * * * *